United States Patent [19]

Nemoto et al.

[11] 4,241,928
[45] Dec. 30, 1980

[54] BOOT SEAL

[76] Inventors: Akira Nemoto, 22 aza-Nishihamagurizawa, Ueta-cho; Yasunori Hamaguchi, 97 aza-Kanbezaka, Ueta-cho, Toyohashi-shi, Aichi-ken, Japan

[21] Appl. No.: 967,468

[22] Filed: Dec. 7, 1978

[51] Int. Cl.² ............................................. F16J 15/32
[52] U.S. Cl. ........................................... 277/212 FB
[58] Field of Search ............................. 277/30, 212 FB

[56] References Cited

U.S. PATENT DOCUMENTS

| 3,220,756 | 11/1965 | Templeton | 277/212 FB |
| 3,343,855 | 9/1967 | Husen | 277/212 FB |

FOREIGN PATENT DOCUMENTS 991243  5/1965  United Kingdom .............. 277/212 FB

*Primary Examiner*—Robert I. Smith
*Attorney, Agent, or Firm*—William A. Drucker

[57] ABSTRACT

A boot seal mounted on a pivotal ball joint comprises a boss portion, a waist portion disposed in the outer periphery of the boss portion and a skirt portion disposed in the outer periphery of the waist portion. The boss portion has an upper surface brought into intimate contact with a lower end surface of a joint member mounted on a shank of the ball joint, and the skirt portion has an internal wall brought into intimate contact with an upper outer periphery of a socket housing in the ball joint. The boss portion is provided at its lower surface with a flare portion protruded downward and outward. The flare portion has, while being elastically flexed, a lower edge placed in touch with an upper end surface of the socket housing. This elasticity of the flare portion provides a close contact between the lower edge of the flare portion and the upper end surface of the socket housing and a close contact between the upper surface of the boss portion and the lower end surface of the joint member.

5 Claims, 6 Drawing Figures

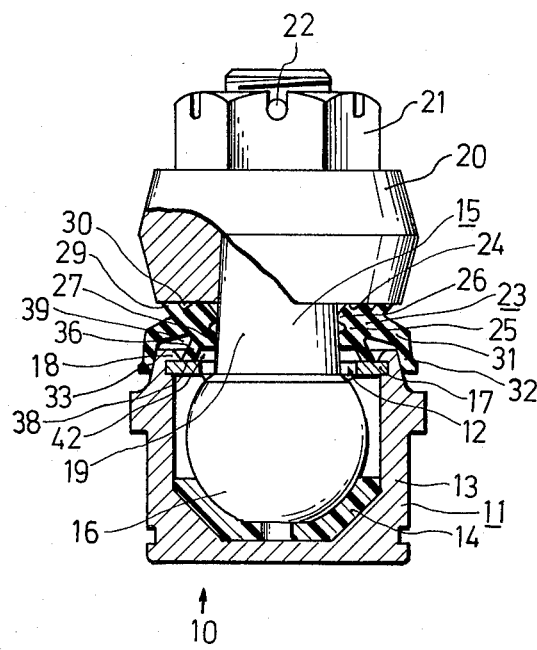
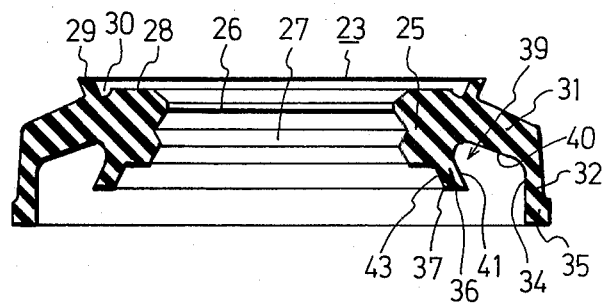
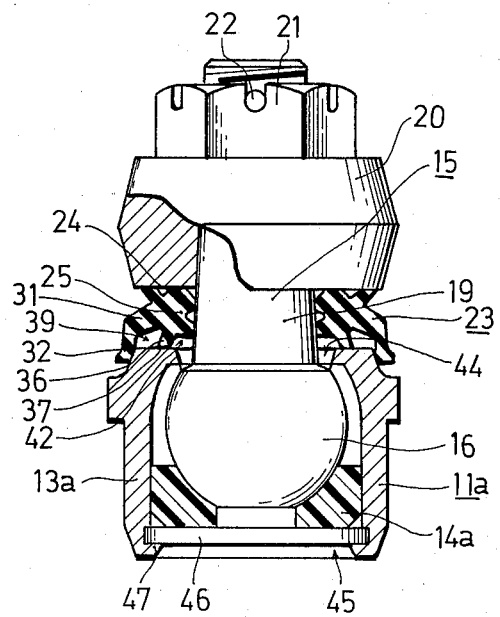

BOOT SEAL

BACKGROUND OF THE INVENTION

1. Field of the Invention

This invention relates to a boot seal for a ball joint which consists of such members as a ball stud and a socket housing holding the head of the stud. More particularly it relates to a boot seal, for a ball joint, in which a ball stud inclines against a socket housing at a relatively small angle, and a relatively small clearance is allowed between a joint member connected to the shank portion of the ball stud and the socket housing confronting the joint member.

2. Description of the Prior Art

The boot seals mounted on the conventional ball joints of this type can be classified into two types. One type covers boot seals provided with a space for a grease room between the internal surface of the boot seal and the upper portion of the housing, and the other covers those without the space. The boot seal of the former type generally comprises an annular boss portion in close contact with the shank portion and a skirt portion extending downward and outward from the boss portion and covering the upper peripheral edge of the socket housing. When the boot seal of this type tilts, gaps are formed between the internal surface of the skirt portion and the upper side surface of the socket housing and between the upper surface of the boss portion and the lower surface of the joint member. A gap is also formed between the joint member and the upper surface of the boss portion on account of the abrasion and the deterioration of elasticity of the internal surface of the skirt portion. Thus foreign matters such as dust are apt to enter the ball joint through the gap. Consequently this type can be utilized usefully only where it is not covered with much dust and the like. The boot seal belonging to the second type is composed generally of a boss portion filling the space between a joint member and a socket housing almost completely and a suitable skirt portion extending outward from the boss portion. Accordingly the boot seal of this type is utilized usefully in the field of application where a means for supplying grease is already prepared at the side of ball joint. In a ball joint of the construction disclosed, for example, in U.S. Pat. No. 3,220,756, a grease nipple is provided at the side wall of the socket housing and grease can be supplied to the interior of the socket housing from the nipple. The boot seal of the second type is utilized effectively in this kind of ball joint.

SUMMARY OF THE INVENTION

An object of the present invention is to provide a boot seal which can prevent dust and the like from entering the socket housing and keep the movement of a ball stud smooth when the boot seal is mounted between a socket housing and a joint member. That is, the upper surface and the internal side surface of the boot seal contacts closely with the lower surface of the joint member and the shank portion of the ball joint respectively, and the skirt portion of the boot seal contacts closely with the external side wall of the upper portion of the socket housing, thus preventing dust from entering the housing through a gap between the joint member and the upper portion of the socket housing.

Another object of the present invention is to provide a boot seal which is adapted for dual seal between the boot seal and the upper portion of the socket housing confronting each other, and can prevent securely the entry of dust and the like into the socket housing. Namely, when the shank portion of the ball stud in a ball joint tilts against the socket housing or rotates around the axis of the shank portion, the skirt portion of the boot seal moves rubbingly on the upper side surface of the socket housing. At this moment, dust and the like are sometimes about to enter the socket housing through the gap between the skirt portion and the upper side surface of the socket housing. However, in the case of the aimed boot seal, an annular flare portion provided and formed on the lower surface of the boot seal contacts with the upper surface of the socket housing. Accordingly dust and the like are hindered to penetrate inward beyond the flare portion.

Another object of the present invention is to provide a boot seal which can preserve the above mentioned sealing function for a long time and therefore is long-lived. Namely, a resilient flare portion, being bent, contacts with the upper surface of the socket housing. As the result, even though the extreme end of the flare portion is used for a long time to be worn away, the bent flare portion is restored to the original state by its resilient force and the extreme end of the flare portion continues to contact with the upper surface of the socket housing. Thus, the above mentioned sealing function between the lower surface of the joint member and the upper surface of the boot seal is maintained satisfactorily.

Still another object of the present invention is to provide a boot seal which is supplied automatically with grease. Because the aforementioned flare portion contacts with the upper surface of the housing, a space is defined, inside the flare portion, which communicates with the interior of the socket housing. Grease contained in this space is drawn successively into the interior of the housing as the shank portion inclines or rotates.

BRIEF DESCRIPTION OF DRAWINGS

FIG. 1 is a front elevational view in partial section showing a ball joint with a boot seal attached;

FIG. 2 is an enlarged, longitudinal section of the boot seal;

FIG. 6 is a front elevational view in partial section showing a ball joint, different from that of FIG. 1, with a boot seal attached.

DESCRIPTION OF THE PREFERRED EMBODIMENT

Figure 3:
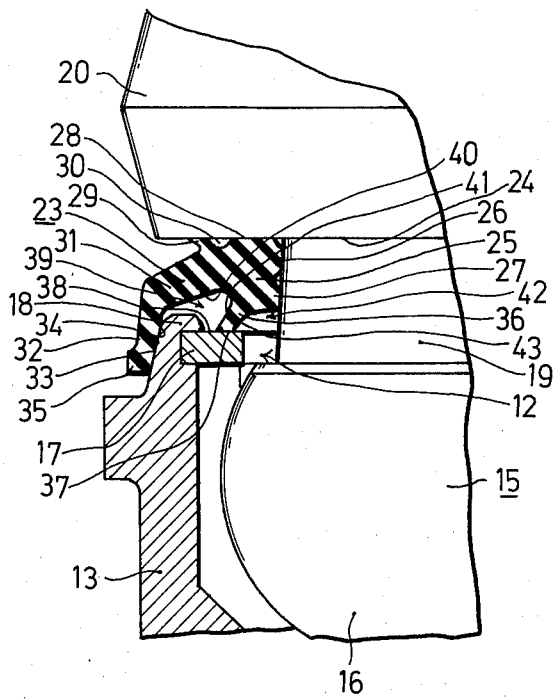
FIGS. 3-5 are enlarged fragmental views in section showing various states of the deformed boot seal, FIG. 3 showing the state with a ball stud in its neutral position, FIG. 4 showing the state with the ball stud inclining to the left, and FIG. 5 showing the state with the ball seal inclining to the right.

First a ball joint assembly 10 shown in FIG. 1 is described. A socket housing 11 has an opening 12 in its upper portion alone and comprises a bottomed barrel portion 13 extending downward from the opening 12. Inside the barrel portion 13, a plastic bearing member 14 is contained which supports the spherical head portion 16 of a ball stud 15. Preferably, the bearing member 14 is made of polyvinyl acetal loaded with oil, and has an outer side surface in conformity with the internal surface of the barrel portion 13 of the socket housing 11 and an internal spherical surface in conformity with the spherical head portion 16. Above the bearing member 14, a washer 17 for preventing falling out is caulked and secured in the opening 12 of the socket housing 11 by means of a caulking portion 18 forming the upper edge of the opening 12.

Figure 4:
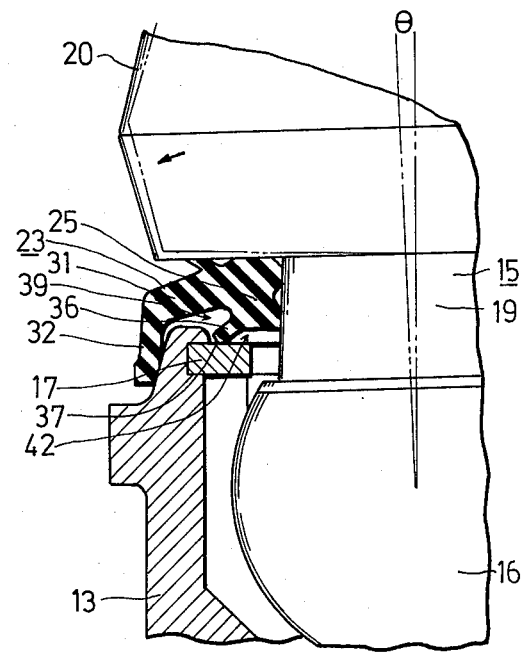
Figure 5:
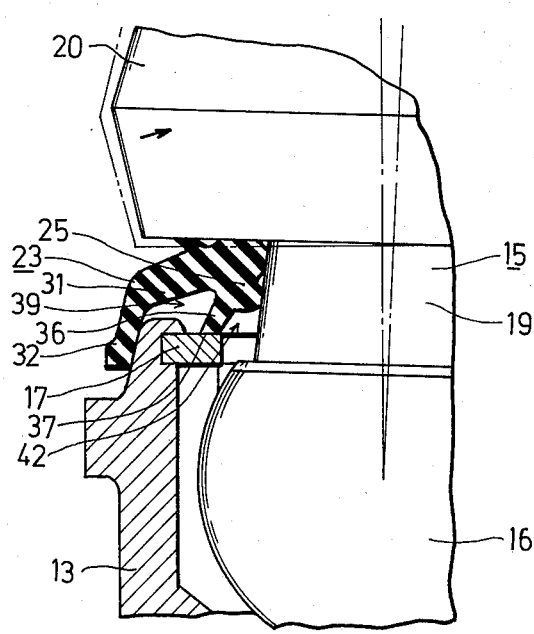

The shank portion 19 of the ball stud 15 extends upward through the washer 17 and the opening 12. A joint member 20 is secured to the shank portion 19 of the ball stud 15 by a mounting nut 21 and a pin 22. In FIGS. 4 and 5, θ denotes the tilting angle of the axis of the ball stud 15 in relation to that of the socket housing 11, and this tilting angle of the ball stud 15 is expected to be relatively small.

A boot seal 23 is made integrally of a suitable elastic material such as natural rubber, and is mounted within a relatively narrow and restricted space between the upper portion of the socket housing 11 and the lower end surface 24 of the joint member 20 confronting said upper portion of the socket housing 11. The boot seal 23 has an intermediate boss portion 25 which engages the shank portion 19 of the ball stud 15 by its own tightening force, and the internal surface of the boss portion 25 is provided with annular seal lips 26 and 27 which protrude toward the axis of said shank portion. The boss portion 25 has a planar upper surface 28 and an upper outer annular lip 29 which extends outward and upward from the upper surface 28 forming an annular channel 30. This upper outer annular lip 29 can be deformed easily in conformity with the lower end surface 24 of the joint member 20 in virtue of the annular channel 30. In this manner, the boot seal 23 has the first sealing part where foreign materials such as dust are prevented from penetrating through the top of the boot seal 23 by the upper outer lip 29, and the second sealing part where the foreign materials such as dust, having escaped the first sealing part, are prevented from penetrating by the seal lips 26 and 27 of the boss portion 25. A waist portion 31 slightly thinner than the boss portion 25 extends in the horizontal direction or a little downward and outward from the integral outer periphery of the boss portion 25. Further, a skirt portion 32 extends downward beyond the lower end of the boss portion 25 from the outer periphery of the waist portion 31 in such a manner that the skirt portion 32 seals resiliently the upper outer periphery 33.

The inner diameter of the internal wall 34 of the skirt portion 32 is made slightly smaller than that of the upper outer periphery 33 which is received within said internal wall 34 and is tapered upward, and the edge of skirt portion 32 is shaped in the form of a bead 35. By virtue of this construction and shaping, the internal wall 34 of the skirt portion 32 is forced to expand and to come into contact with the upper outer periphery 33, and seals the upper outer periphery 33 with its own resilient force when the upper surface 28 is pushed down by the joint member 20. Because the waist portion 31 is thicker than the skirt portion 32, the waist portion 31 is not deformed so much even when the skirt portion 32 is expanded forcedly to be attached on the upper outer periphery 33 of the socket housing 11, but it rather transmits the lowering force exerted by the joint member 20 surely to the skirt portion 32. Thus, the waist portion 31 can make the contact of the skirt portion 32 with the upper outer periphery 33 more close and sure. Moreover, no gap is formed between the internal wall 34 and the upper outer periphery 33 when the ball stud 15 inclines. This is because the waist portion 31, thicker and more solid than the skirt portion 32, is always exerting the lowering force due to the joint member 20 on the skirt portion 32, and the resilient force due to the skirt portion 32 establishes the close contact of the internal wall 34 with the upper outer periphery 33. Namely the waist portion 31 prevents the skirt portion 32 from being deformed for departure from the upper outer periphery 33 of the socket housing 11 even when the ball stud 15 inclines and thus the waist portion 31 maintains the sealing. Furthermore, the lower surface of the boss portion 25 is provided with an annular flare portion 36 extending downward and outward. The edge 37 of this flare portion 36, in the expanded state, contacts with and pushes against the flat surface 38 of the washer 17 secured to the socket housing 11.

This flare portion 36 extends downward to a position lower than the boss portion 25 and than the waist portion 31. The edge 37 contacts resiliently with the upper flat surface 38 of the washer 17 to accumulate its elastic energy and exerts a resilient force to push up the boss portion 25 towards the lower end surface 24 of the joint member 20 when the upper surface 28 of the boss portion 25 is pushed down by the joint member 20. Accordingly this flare portion 36 can prevent the movement of the boss portion 25 toward the socket housing 11 owing to the force to push up the boss portion 25 on the joint member 20, and always maintains the close contact of the upper surface 28 of the boss portion 25 with the lower end surface 24 of the joint member 20.

Namely this flare portion 36 first eliminates the formation of a gap between the lower end surface 24 of the joint member 20 and the upper surface 28 of the boss portion 25 when the ball stud 15 inclines. Second the flare portion 36 still pushes the boss portion 25 upward by its own resilient force, and prevents the upper surface 28 of the boss portion 25 from departing from the lower end surface 24 of the joint member 20 even though the elasticity of the skirt portion 32 is deteriorated and whole the boot seal 23 becomes movable toward the socket housing 11. Thus, the flare portion 36 can preserve efficiently the sealing function of the boot seal 23 (between the upper surface 28 and the lower end surface 24) for a long time.

Because the flare portion 36 is annular and is extending outward and downward from the periphery of the lower surface of the boss portion 25, the edge 37 of the flare portion 36 is pushed on the flat surface 38 of the washer 17 so as to be expanded and, at the same time, the whole peripheral length of the edge 37 contacts closely with the flat surface 38 of the washer 17 when the upper surface 28 is pushed down by the joint member 20, i.e. when the boot seal 23 is mounted on the socket housing 11. As the result, the flare portion 36 of the boot seal 23, thus mounted on the socket housing 11, moves with its edge 37 contacting always slidably with the flat surface 38 of the washer 17 as the ball stud 15 inclines. Namely the flare portion 36 is deformed as shown in FIGS. 4 and 5 when the ball stud 15 inclines. Consequently the elastic energy of this flare portion 36 which has been accumulated in order to lift the boss portion 25 to the lower end surface 24 of the joint member 20 is not decreased. At the same time, the flare portion 36 keeps the whole peripheral length of its edge 37 in close contact with the flat surface 38 of the washer 17 by the restoring force due to the accumulated elastic energy, and seals always the boundary between the edge 37 and the flat surface 38 of the washer 17 even when the ball stud 15 inclines.

The boot seal 23 provides the following two important spaces when it is mounted on the ball joint. The first space is the space 39 which is defined by the internal wall 34 of the skirt portion 32, internal surface 40 of the waist portion 31 and the external wall 41 of the flare portion 36. This space 39 permits the skirt portion 32 to move slidably keeping contact with the upper outer periphery 33 of the socket housing 11 without being affected by the force of the flare portion 36 to push up the boss portion 25 even when the ball stud 15 inclines. Furthermore, owing to this space 39, the caulking portion 18 of the upper part of the socket housing 11 can be contained with sufficient margin in the ball joint of the type of the present embodiment, without being obstructed by the internal surface 40 of the waist portion 31.

The second space is the space 42, for a grease space, which is formed around the shank portion 19 by the lower surface of the boss portion 25 and the internal surface 43 of the flare portion 36 confronting each other with a sufficient spacing. In this space 42, for example, grease is filled as a lubricant and is supplied automatically into the socket housing 11 as the ball stud 15 inclines. The grease also prevents the penetration into the socket housing 11 of the foreign materials such as dust which have passed through the first space 39.

Next referring to FIG. 6, the situation is described briefly in which the boot seal 23 according to the present invention shown in FIG. 2 is mounted on a ball joint of different type. A socket housing 11a is provided with an upper opening 44 through which the shank portion 19 of the ball stud 15 protrudes upward and with an opposite lower opening 45 closed with a closure plate 46. The closure plate 46 is secured at the lower peripheral edge of the socket housing 11a by a caulking portion 47, and a bearing member 14a supporting the spherical head portion 16 is contained inside a barrel 13a of the socket bearing 11a.

The edge 37 of the flare portion 36 of the boot seal 23 contacts resiliently with the upper surface 28, and exerts a force on the boss portion 25 to push up it toward the lower end surface 24. The other matters are the same as in the case of FIG. 2.

As is clear from the above description, the boot seal according to the present invention not only has the dual, i.e. upper and lower, sealing parts against the penetration of foreign materials such as dust, but also it can make amends for the deterioration of the sealing function due to the wear of itself and to the deterioration of its elastic qualify within the relatively narrow and restricted extent between the upper part of the socket housing and the joint member. Thus, it can keep up the automatic supply of lubricating oil for a long time.

What we claim is:
1. In combination:
 (i) a ball joint comprising:
  (a) a socket housing having an open end with an inturned flange at said open end, said flange being formed with an opening at inner periphery thereof, said flange having a flat outer surface,
  (b) a bearing member secured internally of said socket housing and having a part spherical internal surface,
  (c) a ball stud including a spherical head portion and a shank portion integral with said head portion, said head portion being disposed and held rotatably, within said socket housing between said flange and said part-spherical internal surface, said shank portion extending through said open end of the socket housing,
  (d) a joint member secured to said shank portion spaced from said head portion,
 (ii) a boot seal formed wholly of resiliently deformable material, said boot seal including,
  (A) an annular boss portion positioned about said shank portion, said boss portion having an inner peripheral surface in close contact with an outer peripheral surface of said shank portion, said boss portion further having an upper end surface abutting a lower surface of said joint member, said boss portion further having a lower surface spaced from the open end of the socket housing and which is moved towards and away from said open end according to tilting movement of said shank portion about the centre of said ball head portion,
  (B) an annular waist portion extending outwardly from the outer periphery of said boss portion,
  (C) an annular skirt portion extending from an outer peripheral edge of said waist portion towards said socket housing and abutting the upper outer periphery of said socket housing,
  (D) an annular flare portion extending downwardly and outwardly from an outermost peripheral portion of the lower face of the boss portion towards an upper flat surface of the inturned flange of the socket housing, said flare portion having its free end in sliding contact with said upper flat surface so as to be movable radially of said flange in response to tilting of said shank portion, a space bounded by the opening of the inturned flange, ball head portion, the ball shank portion, the lower surface of the boss portion and the internal surface of the flare portion being filled with grease.

2. The combination of claim 1 wherein said boot seal has an annular lip at the outer periphery of said upper end surface and an annular channel is defined between said upper end surface and said annular lip, said annular lip being shaped so as, prior to engagement of the boot seal between said joint member and said socket housing, to extend outwardly beyond said upper surface, said lip in the assembled condition bearing at its free edge on said joint member.

3. The combination of claim 1 wherein said inturned flange is an annular washer secured in said open end of the housing.

4. The combination of claim 1 wherein said waist portion is formed thinner than said boss portion, and said skirt portion is formed thinner than said waist portion.

5. The combination of claim 1 wherein the internal surface of said waist portion opposed to the upper surface of the socket housing is recessed, and wherein an annular space is bounded by said recessed surface, the internal side surface of said skirt portion, the external surface of said flare portion, and the upper surface of said socket housing, said space preventing transmission of movement between the flare portion and the waist portion.

* * * * *